April 4, 1961 R. L. ZAPP 2,978,426
ABRASION-RESISTANT BUTYL RUBBER TIRES
Filed Oct. 28, 1955
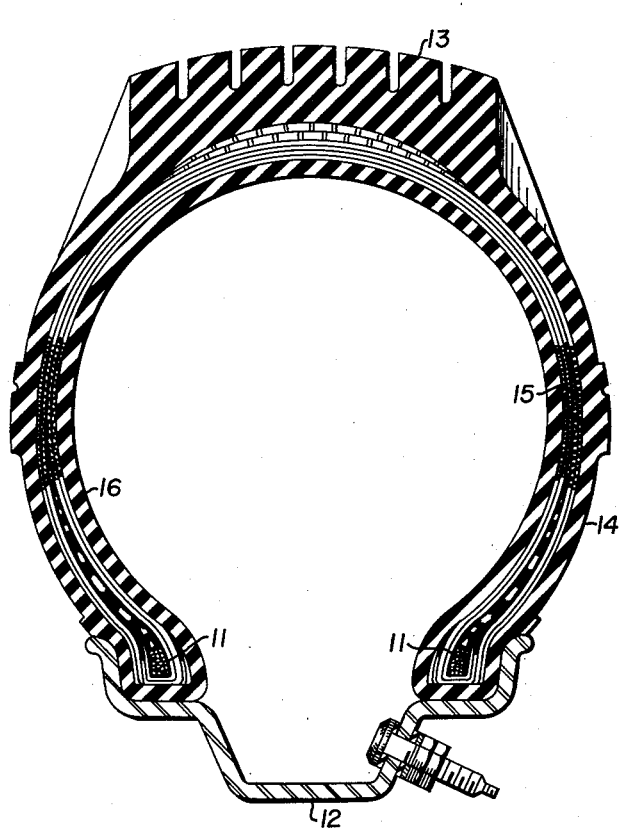
Robert L. Zapp    Inventor
Small, Dunham & Thomas
By  W. H. Smyers  Attorney

# United States Patent Office 2,978,426
Patented Apr. 4, 1961

2,978,426

ABRASION-RESISTANT BUTYL RUBBER TIRES

Robert L. Zapp, Florham Park, N.J., assignor to Esso Research and Engineering Company, a corporation of Delaware Filed Oct. 28, 1955, Ser. No. 543,542

8 Claims. (Cl. 260—23.7)

This invention relates to high molecular weight vulcanizable and vulcanized polymeric compositions of improved abrasion resistance and to methods of producing and using same. More particularly, the present invention relates to compositions comprising a major proportion of a high molecular weight vulcanizable butyl rubber with minor proportions of substantially saturated hydrocarbon oils; said compositions when vulcanized having increased abrasion resistance.

The invention further relates to compositions comprising a major proportion of an extremely high molecular weight vulcanizable butyl rubber, a minor proportion of a substantially saturated hydrocarbon plasticizer oil having an iodine number below about 50 cg./g. and certain pigments, basic metal compounds, such as bivalent metal oxides, ultra-accelerators, etc.

Butyl rubber or GR-I rubber (government rubber-isobutylene) as referred to in the prior art comprises at least a major proportion of an iso-olefin-multiolefin reaction product and may be made by such processes as disclosed in U.S. Patent Nos. 2,356,128 and 2,399,672, and equivalent processes as disclosed in other patents and in the literature, e.g. textbook "Synthetic Rubber," by G. S. Whitby (1954 Edition). In many respects such butyl rubber is ideally suited for premium grade rubber tires except in the tread area, i.e., premium grade butyl tires of the prior art have been deficient as to wearing qualities.

By the present invention it is now possible to produce a butyl rubber tire where the tread area thereof is characterized by substantially superior abrasion resistance. This is accomplished by producing a butyl rubber polymer having a viscosity average molecular weight of substantially above 750,000 such as about 850,000 or 1,000,000 up to 2,000,000; 3,000,000 or higher; said polymer having been extended with various substantially saturated hydrocarbon plasticizer oils. The viscosity average molecular weight is determined in accordance with the standard procedure described in Synthetic Rubber, G. S. Whitby (1954), pages 332-333.

The invention will be best understood by reference to the accompanying drawing in which the single figure is a cross-sectional view of a pneumatic tubeless tire employing therein in the casing and tread area the high molecular weight butyl rubber of the present invention, wherein the tire is depicted as being mounted on a conventional tubeless tire type of tire wheel rim. Although the subsequent description and the drawing are confined to a tubeless tire, obviously the butyl rubber compositions of the present invention may be likewise employed in conventional inner tube-containing tires and may be used for other purposes, e.g. abrasion-resistant conveyor belts, fan belts, rubber overshoes, etc.

One embodiment of the present invention comprises a process for the preparation of the above compositions in which an extremely high molecular weight butyl rubber is blended with a paraffinic, naphthenic, or aromatic oil. The butyl rubber preferably contains about 95 to 99 (especially 97.5 to 99.5) wt. percent of a $C_4$-$C_7$ isoolefin (e.g. isobutylene) and about 5.0 to 0.5 (especially 2.5 to 0.5) wt. percent of a $C_4$-$C_{14}$ (preferably $C_4$-$C_6$ or $C_8$) conjugated multi-olefin (e.g. isoprene). The polymerization conditions to produce the high molecular weight butyl rubber employed in the present invention are carefully regulated as to catalyst concentration, contaminants, and yield of rubbery polymer. Also the finishing conditions of the rubbery polymer are at reduced temperatures and under reduced shearing stresses.

A typical process for producing such a high molecular butyl rubber is by employing the following polymerization conditions: Use of especially pure reactants (particularly as regards the iso-olefin); maintaining the weight ratio of the iso-olefin and multi-olefin at about 97.5–99.5% and about 2.5–0.5% respectively; removing $C_4$ contaminating hydrocarbons from the catalyst (e.g. by distillation); maintaining the catalyst concentration in the diluent at about 0.01–0.1 (preferably about 0.02–0.06) wt. percent based on the weight of diluent; said catalyst being present in amounts of about 0.01–0.10 wt. percent (preferably 0.02 to 0.06 wt. percent) based on feed whereby to regulate the conversion of monomer to polymer at between about 50–80%, preferably 60–70%; decreasing shearing stresses in rubber finishing; and maintaining finishing temperatures below about 350° F., preferably below about 300° F. (e.g. 250°–275° F.). The above conditions are preferably employed in combination, although certain of said conditions may be eliminated and/or varied as more fully described hereinafter.

Into such a high molecular weight butyl rubber as above may then be compounded other materials such as pigments, zinc oxide, ultra-accelerators, such as telluriumdialkyl-dithiocarbamates, polyalkyl thiuram sulfides, etc. The above composite is then cured with sulfur and/or sulfur containing compounds at temperatures of about 200°–450° F., preferably at 250°–400° F. (e.g. 280°–350° F.) for about 5–200 minutes to produce a vulcanizate which, when compounded with substantially saturated hydrocarbon oils, exhibits extremely high abrasion resistance.

A more specific embodiment of the invention relates to tires containing butyl rubber extended with about 10–50 wt. percent (preferably about 15–40 wt. percent) of a hydrocarbon oil having an iodine number of not more than about 50 cg./g.; said tires being of remarkedly increased abrasion resistance. This embodiment further entails methods of producing said tires wherein at least the tread area thereof comprises and preferably consists essentially of an extremely high molecular weight butyl rubber, 100 parts by weight of which are preferably compounded to contain about 5–100, generally about 10–75, advantageously about 15–50, preferably about 20–30 or 40 parts by weight of a substantially saturated hydrocarbon plasticizer oil which is preferably a paraffinic or naphthenic oil advantageously having an iodine number of below about 20 or 30. The following materials are also advantageously added: About 10–100 or 150, preferably about 25–75 parts by weight of a pigment or filler such as silica, metal silicates or especially a finely divided carbon black such as a channel black (e.g. M.P.C. black), a fine furnace black (e.g. S.A.F. black) etc.; about 1–50 (advantageously about 2–30), preferably about 5–10 or 15 parts by weight of zinc oxide; about 0–5, preferably about 0.1–2.5 parts by weight of an accelerator such as mercapto-benzo-thiazole or benzo-thiazyl-disulfide; and about 0.1–5.0 (advantageously about 0.2–2.5), preferably about 0.5–1.5 or 2.0 parts by weight of an ultra-accelerator such as tetramethyl thiuram disulfide, tellurium-diethyl-dithiocarbamate, etc. The resulting composition is then cured with vulcanizing quantities of a sulfur-containing compound and/or preferably sulfur (e.g. about 0.1–10.0, preferably about 0.5–5.0 parts by weight of sulfur) at a temperature level of about 250°–400° F., preferably about 280° to 350° F. for about 10–200 minutes (preferably about 30–100 minutes) and fabricated into a rubber tire in at least the tread portion thereof.

A representative process for producing a particularly desirable high molecular weight butyl rubber comprises reacting about 90–99, preferably about 95–99.5 wt. percent of a low molecular weight iso-olefin, such as isobutylene, with about 0.1–10 (advantageously 0.5–5) preferably about 1.0–3.0 wt. percent of a conjugated di-olefin, preferably isoprene, at relatively low temperatures, i.e. from about 0° to –200° C. or lower, an advantageous range being from about –40° to –160° C. (preferably between about –80° to –120° C.) in the presence of 0.01–0.1 (preferably about 0.02–0.06) wt. percent of a Friedel-Crafts type catalyst, such as aluminum bromide, aluminum chloride, titanium tetrachloride, boron trifluoride, uranium chloride, aluminum ethoxy-chloride, etc., dissolved in an alkyl halide such as ethyl or methyl chloride, or dissolved in heptane, carbon disulfide or equivalent solvent. Although a conjugated diolefin is preferred and isoprene is especially advantageous for this purpose, the diolefin may be replaced with minor proportions of other multi-olefins, such as butadiene, dimethyl butadiene, myrcene, piperylene, alloocimene, etc. Copolymers consisting of isobutylene and isoprene are preferred.

Furthermore, according to the present invention, the $C_4$–$C_7$ iso-olefin (such as isobutylene) is optionally, but most advantageously, maintained at a purity above 99% by weight and especially above about 99.5% purity by weight. The greater the purity of the iso-olefin, the higher molecular weight type of butyl rubber polymer may be obtained under any given set of conditions. The purity of the $C_4$–$C_{14}$ ($C_4$–$C_{10}$ or preferably $C_4$–$C_8$) multiolefin, such as isoprene, is less important, since the isoprene is present in amounts of about $\frac{1}{20}$ or less that of the iso-olefin, such as isobutylene. Therefore, the purity of the multiolefin, such as isoprene, is generally regulated at about 80–100% (advantageously 85–95% and preferably about 95–98% or higher) purity, although isoprene of slightly different purity may be used. The desired degree of purity of these materials is preferably obtained by fractionation followed by extraction by an acid such as sulfuric acid with at least one more fractionation.

The reactant throughout rate is regulated at about 1–4 pounds of feed per hour per square foot of polymerization reaction surface, while also maintaining a polymer slurry concentration in the methyl chloride or hydrocarbon reaction diluent of about 10–25, especially about 15–20, weight percent.

Decreasing the molecular weight breakdown of the final rubbery polymer is accomplished by reducing and preferably eliminating, milling of the resulting polymer and either eliminating the final extruding step or decreasing the compression, squeezing, pressure and rate of shear in the extruder to an extent sufficient that shearing stresses are decreased from a normal value of about 0.05–0.2 horsepower per pound per hour down to a value of below about 0.03 horsepower per pound per hour. Furthermore, the molecular weight of the resulting polymer has been found to be maintained within the limits as hereinbefore mentioned by controlling the temperature throughout the finishing treatment at below about 300° F. and preferably below about 250° to 220° F. (e.g. 200° F.).

In general, the high molecular weight butyl rubber polymer as above produced, has a viscosity average molecular weight within the range of about 850,000 to 2,000,000, the iodine number (Wijs being in the range of about 0–20, preferably in the range of about 1–10. The above copolymer, when cured with sulfur or sulfur-containing compositions, has good elasticity, tensile strength, and flexure resistance in addition to its superior abrasion resistance. As mentioned before, the high molecular weight butyl copolymer of the present invention may be compounded with various fillers, pigments, anti-oxidants, hydrocarbon plasticizer oils, etc., generally in a similar manner as for low molecular weight butyl copolymers, except that the oil tolerance of the H.M. butyl rubber of the present invention is higher.

The general characteristics for a suitable hydrocarbon type plasticizer oil may be as follows or its equivalent:

|  | Preferred | Minimum | Maximum |
|---|---|---|---|
| API° Gravity | 15–28 | 10 | 35 |
| Flash Point, ° F. (Open Cup Method) | 525 | 300 | 700 |
| Pour Point, ° F. | 15–30 | 10 | 60 |
| SSU @ 100° F. | 100–12,000 | 50 | 20,000 |
| Iodine No. | 0–20 | 0 | 50 |

The amount of oil employed (which oil advantageously has an iodine number of less than about 20, especially about 0–10, and is preferably a naphthenic type oil or even more especially a paraffinic type oil) will depend upon the molecular weight of the butyl rubber polymer. For instance, for 100 parts by weight of butyl rubber polymers having a viscosity average molecular weight within the range of about 750,000 to about 1,250,000, about 1–30 (preferably about 5–30) parts by weight of the oil is generally desirable, whereas if the polymer viscosity average molecular weight varies from about 1,250,000 up to about 1,500,000 or 2,000,000, the amount of the plasticizer oil is desirably within the range of about 10–75 (especially about 15–50) parts by weight.

It is noted that the higher proportion of plasticizer oil tolerated results in distinct technical and economical advantages. For instance, oil-extension of rubber decreases the product cost since oil is generally much cheaper than rubber. Furthermore, an oil-extended high molecular weight butyl rubber according to the invention has greatly increased abrasion resistance as compared to the high molecular weight butyl rubber per se.

In order to more fully illustrate the present invention, the following examples are given.

*Example 1*

A high molecular weight butyl rubber of 1,100,000 viscosity average molecular weight was prepared as follows:

Ninety-nine parts by weight of isobutylene of 99.8 wt. percent purity was mixed with 1 part by weight of isoprene of 99% purity. This mixture was diluted with n-heptane so as to form a 65.8 wt. percent solution of reactants in the diluent. The resulting mixture was then cooled to –85° C. and continuously fed into a reactor at a rate of 400 cc. per minute. To this cold mixture there was then continuously added, at a rate of 17 cc. per minute, a prechilled solution of 0.40 gram of solid aluminum bromide catalyst dissolved in 100 cc. of n-heptane. The polymerization reaction began immediately and was allowed to proceed to 65% conversion of the olefinic material into polymer. The resulting rubbery polymer when recovered and dried at 175° C. had a viscosity average molecular weight of 1,100,000.

The following compositions were then compounded on a laboratory mill:

| Material | Composition | |
|---|---|---|
| | A | B |
| Commercial GR-I-18 (500,000 Mv.) | 100 | |
| H.M. Butyl (1,100,000 M̄v.) | | 100 |
| Plasticizer Oil-A | 5 | 20 |
| MPC Carbon Black | 50 | 50 |
| Zinc Oxide | 5 | 5 |
| Sulfur | 1 | 1 |
| Tellurium Diethyl Dithiocarbamate | 1 | 1 | wherein the plasticizer oil-A is a naphthenic hydrocarbon oil having an iodine number of 23 cg./g. (i.e. centigrams of iodine added per gram of oil) and the following physical characteristics:

Specific gravity _____ 0.90
Flash point, ° F. (Open Cup Method) _____ 445
Aniline point, ° F. _____ 215
SSU @ 210° F. _____ 58.1

The above Compositions A and B were then cured for 40 minutes at 307° F. The cured GR-I-18 and H.M. butyl containing compounds according to the present invention were then tested for abrasion resistance on a Lambourn abrader operating at 20% slip. The following abrasion losses were noted in grams per kilometer:

| Abrasion Loss | |
|---|---|
| Composition A | Composition B |
| 0.35 | 0.07 |

It is apparent from the above that when employing the high molecular weight butyl rubber in conjunction with a substantially saturated hydrocarbon plasticizer oil according to the present invention, the abrasion resistance of the resulting vulcanized composition is surprisingly improved. This is exemplified by comparing Compositions A and B, wherein Composition B, which contains H.M. butyl and 20 parts by weight of a plasticizer oil, has approximately one-fifth the wear loss of a conventional butyl rubber composition (composition A) employing only 5 parts by weight of the same oil.

*Example II*

In order to compare the effect of the oil-extended high molecular weight butyl rubber of the invention in the tread area of rubber tires, the following runs were made wherein the H.M. butyl rubber of 920,000 viscosity average molecular weight was prepared as follows:

Ninety-nine parts by weight of isobutylene of 99.6 wt. percent purity was mixed with 1 part by weight of isoprene of 98 wt. percent purity. This mixture was diluted with n-heptane so as to form a 66.0 wt. percent solution of reactants in the diluent. The resulting mixture was then cooled to −85° C. and continuously fed into a reactor at a rate of 400 cc. per minute. To this cold mixture there was then continuously added, at a rate of 18 cc. per minute, a prechilled solution of 0.35 gram of solid aluminum bromide catalyst dissolved in 100 cc. of n-heptane. The polymerization reaction began immediately and was allowed to proceed to 68% conversion of the olefinic material into polymers. The resulting rubbery polymer as recovered and dried at 175° C. had a viscosity average molecular weight of 920,000.

The compositions as compounded on a laboratory mill were as follows:

| Material | Composition | | Commercial Control Tire |
|---|---|---|---|
| | C | D | |
| GR-I-15 (450,000 M̄v.) | 100 | | (Mixed natural and synthetic rubbers.) |
| H.M. Butyl (920,000 M̄v.) | | 100 | |
| MPC Carbon Black | 50 | 60 | |
| Plasticizer Oil-B | 3 | 20 | |
| Sulfur | 1 | 1 | |
| Tetramethyl Thiuram Disulfide | 1.2 | 1.2 | |
| Zinc Oxide | 5 | 5 | | wherein oil-B is a paraffinic hydrocarbon oil having an iodine number of 24 cg./g. and the following characteristics:

Specific gravity _____ 0.89
Flash point, ° F. (Open Cup Method) _____ 355
Aniline point, ° F. _____ 191
SSU at 210° F. _____ 39.5

The above Compositions C and D were extruded in camel-back form and adhered to a buffed all-butyl tire carcass. Adhesion was obtained by using a butyl rubber cement of the following composition:

Material:                                 Parts by weight
  GR-I-15 _____ 100
  MPC carbon black _____ 30
  Plasticizer oil C _____ 5
  Sulfur _____ 2
  Tetramethyl thiuram disulfide _____ 1
  Zinc oxide _____ 5
  Benzothiazyl disulfide _____ 1 wherein oil-C is an aromatic hydrocarbon oil having an iodine number of 49 cg./g. and the following characteristics:

Specific gravity _____ 0.96
Flash point, ° F. (Open Cup Method) _____ 535
Aniline point, ° F. _____ 170
SSU at 210° F. _____ 259

The cure was accomplished in a commercial retreading mold at an average temperature of 295° F. for 80 minutes.

The tires were then experimentally run on a test automobile for 3600 miles under normal use. The wheel positions of the tires were rotated periodically about every 600 miles. The abrasion loss was determined by weighing the tires before and after use. The results are tabulated:

| Wear Loss—Grams | | |
|---|---|---|
| Composition-C | Composition-D | Commercial Tire |
| 672 | 488 | 524 |

From the above it is evident that the butyl rubber tire employing conventional butyl rubber composition-C (GR-I-15) lost somewhat more weight because of wear than did the commercial grade tire which was used as a control. However, the tire containing composition D (oil extended H.M. butyl of the present invention) lost considerably less weight than did the commercial grade tire, which shows that the H.M. butyl-containing compositions of the invention, especially with high oil content, are particularly desirable for use in the tread area of tires.

Referring now to the drawing, the pneumatic tubeless tire shown comprises a hollow toroidal type member which is substantially U-shaped in cross-section by virtue of an open portion which extends around the inner periphery of the member. In other words, the member is of a tubular type structure which has a cross-section in the form of an open-bellied body with spaced terminal portions to define a member generally resembling a horseshoe, wherein the open portion of the horseshoe-shaped member faces toward the interior circumference of said member. The terminal portions constitute the bead portions 11—11 of the tire, inside of which are a plurality of bead wires adhesively embedded and molded in a rubber. The outer surface of the bead portion is advantageously formed into an air-sealing means, such as a plurality of ribs to aid in adhesion to rim 12 and facilitate air-sealing when the tire is inflated. The remaining outer surface of the tire also includes tread area 13 and sidewalls 14. It is in the tread area 13 that the oil extended H.M. butyl rubber compositions of the present invention has found its most extensive use.

The remaining construction of the tire may vary according to conventional fabrication, but in general the tire is a multi-layered type of structure with an outer layer as above mentioned. The layer next adjacent the outer layer generally comprises a carcass 15 which includes a rubber which has incorporated therein a fabric composed of a plurality of cotton, rayon, or nylon cords, etc. The tire also includes an inner lining 16, advantageously made from rubber, e.g., butyl rubber, natural rubber, the oil extended H.M. butyl rubber of the present invention, combinations thereof, etc. The inner lining must be substantially impermeable to air unless the carcass layer is made of butyl rubber. The lining may also advantageously comprise neoprene type rubber or a rubbery copolymer of about 20–99.5 (especially about 70–99) wt. percent of a $C_4$–$C_7$ iso-olefin, such as isobutylene and about 0.5–80 (especially about 1–30) wt. percent of a $C_4$–$C_{14}$ multi-olefin, such as isoprene (prepared as above, or of butadiene according to U.S. Patent No. 2,607,764, or by an equivalent process) which has been at least partially vulcanized for about 1–60 minutes or more at least at about 150°–400° F., preferably about 250°–350° F. with from about 0.1–10.0 wt. percent sulfur based on the weight of the copolymer. The above multi-layers, at least three in number, are conventionally bonded or otherwise adhered together; for example, by vulcanization to form a tire of a unitary structure.

The H.M. butyl rubber-oil compositions of the present invention may be employed generally throughout the tire, but especially in the tread area. The H.M. butyl-oil compositions of the invention may be used alone or in admixture with other vulcanizable rubbery materials. However, for the tread area of the tire it is preferred to employ the H.M. butyl-oil compositions of the invention per se and for the inner lining of the tire to employ a butyl type rubber such as ordinary butyl rubber, the H.M. butyl rubber-oil compositions of the invention, mixtures thereof, or natural rubber.

Insofar as the intermediate carcass layer is concerned, said layer may comprise butyl rubber, the oil extended H.M. butyl rubber of the present invention, and/or certain other rubbers such as natural rubber, synthetic rubbers, mixtures thereof, and reclaimed mixtures thereof, especially to include GR–S rubber and/or natural rubber. As regards the inner lining, if said lining is of the oil extended H.M. butyl rubber of the invention, said lining should be at least partially vulcanized by heating for about 3–60 minutes or more at about 250°–350° F. with about 0.2 to 5.0–10.0 wt. percent of sulfur or more on a basis of total weight of butyl rubber.

While there are above described a number of specific embodiments of the present invention, it is obviously possible to produce other embodiments and various equivalent modifications and variations thereof without departing from the spirit of the invention or the scope of the appended claims.

What is claimed is:

1. A composition comprising an isoolefin-multiolefin rubbery copolymer having a viscosity average molecular weight substantially in excess of 750,000 and about 10 to 50 weight percent of a hydrocarbon plasticizer oil having an iodine number of not more than about 50 cg./g.; said copolymer having been prepared by polymerizing about 90 to 95.5 weight percent of a $C_4$ to $C_8$ isoolefin with less than about 5.0 weight percent of a $C_4$ to $C_{14}$ multiolefin in the presence of a solution of an aluminum halide catalyst dissolved in a solvent by removing contaminating hydrocarbons from the catalyst and by maintaining the catalyst concentration in the solution at about 0.02 to 0.06 weight percent based on solvent, subsequently milling and extruding with shearing stresses in the copolymer being less than 0.03 horsepower per pound per hour and simultaneously maintaining the temperature therein at less than 350° F.; said composition being capable of being cured to provide a vulcanizate therefrom with improved abrasion resistance.

2. Composition according to claim 1 in which the molecular weight of the butyl rubber copolymer is at least about 900,000, the oil being present in amounts of about 15–50 parts by weight.

3. A composition comprising a rubbery copolymer having a viscosity average molecular weight above 900,000; said copolymer being prepared by polymerization about 90–95 weight percent of a $C_4$ to $C_8$ isoolefin with less than about 5.0 weight percent of a $C_4$ to $C_{14}$ multiolefin in the presence of a solution of an aluminum halide catalyst dissolved in a solvent by removing contaminating hydrocarbons from the catalyst and by maintaining the catalyst concentration in the solution at about 0.02 to 0.06 weight percent based on solvent, subsequently milling and extruding with shearing stresses in the copolymer being less than 0.03 horsepower per pound per hour, and simultaneously maintaining the temperature therein at less than 350° F.; said copolymer, 100 parts thereof, being capable of being compounded with about 10–75 parts by weight of a hydrocarbon oil having an iodine number of not more than about 50 selected from the group consisting of naphthenic oils, aromatic oils, paraffin hydrocarbon-containing oils, and mixtures thereof; about 0–5 parts by weight of an accelerator; about 10–100 parts by weight of a finely divided pigment; about 1–50 parts by weight of zinc oxide; and vulcanizing amounts of sulfur; said compounded copolymer being capable of being cured to provide a vulcanizate therefrom with improved abrasion resistance.

4. A composition comprising about 100 parts by weight of a high molecular weight isoolefin-multiolefin butyl rubber copolymer having a viscosity average molecular weight of above about 900,000; said copolymer having been prepared by polymerizing about 90 to 95.5 weight percent of a $C_4$ to $C_8$ isoolefin with less than about 5.0 weight percent of a $C_4$ to $C_{14}$ multiolefin in the presence of a solution of an aluminum halide catalyst dissolved in a solvent by removing contaminating hydrocarbons from the catalyst and by maintaining the catalyst concentration in the solution at about 0.02 to 0.06 weight percent based on solvent, subsequently milling and extruding with shearing stresses in the copolymer being less than 0.03 horsepower per pound per hour, and simultaneously maintaining the temperature therein at less than 350° F.; about 15 to 50 parts by weight of a hydrocarbon plasticizer oil having an iodine number of not more than 50; about 0.1 to 5.0 parts by weight of an accelerator; about 10 to 100 parts by weight of a carbon black; about 1 to 50 parts by weight of zinc oxide; and vulcanizing amounts of sulfur; said composition having been vulcanized between about 250°–400° F. for a time sufficient to produce a vulcanizate of superior abrasion resistance.

5. A process which comprises polymerizing about 90 to 95.5 weight percent of a $C_4$ to $C_8$ isoolefin with less than about 5.0 weight percent of a $C_4$ to $C_{14}$ multiolefin in the presence of a solution of an aluminum halide catalyst dissolved in a solvent by removing contaminating hydrocarbons from the catalyst and by maintaining the catalyst concentration in the solution at about 0.02 to 0.06 weight percent based on solvent; subsequently milling and extruding with shearing stresses in the copolymer being less than 0.03 horsepower per pound per hour, and simultaneously maintaining the temperature therein at less than 350° F. to provide a copolymer therefrom with a viscosity average molecular weight greater than 750,000; said copolymer being capable of being compounded with about 10 to 50 weight percent of a hydrocarbon plasticizer oil having an iodine number of not more than about 50 cg./g. and being capable of being cured to provide a vulcanizate therefrom with improved abrasion resistance.

6. A rubber tire which contains in the tread portion thereof a composition comprising an isoolefin-multiolefin butyl rubber copolymer having a viscosity average molecular weight in excess of about 750,000 which has been extended with about 10 to 50 weight percent based on copolymer of a substantially saturated hydrocarbon plasticizer oil having an iodine number of not more than about 50 cg./g.; said copolymer having been prepared by polymerizing about 90 to 95.5 weight percent of a $C_4$ to $C_8$ isoolefin with less than about 5.0 weight percent of a $C_4$ to $C_{14}$ multiolefin in the presence of a solution of an aluminum halide catalyst dissolved in a solvent by removing contaminating hydrocarbons from the catalyst and by maintaining the catalyst concentration in the solution at about 0.02 to 0.06 weight percent based on solvent, subsequently milling and extruding with shearing stresses in the copolymer being less than 0.03 horsepower per pound per hour, and simultaneously maintaining the temperature therein at less than 350° F.

7. In a process for manufacturing a rubber tire including a carcass member, the combination which comprises vulcanizing to said carcass member a layer disposed exteriorly thereof comprising an isoolefin-multiolefin butyl rubber copolymer having a viscosity average molecular weight of between about 900,000 and 2,000,000 prepared by polymerizing about 90 to 95.5 weight percent of a $C_4$ to $C_8$ isoolefin with less than about 5.0 weight percent of a $C_4$ to $C_{14}$ multiolefin in the presence of a solution of an aluminum halide catalyst dissolved in a solvent by removing contaminating hydrocarbons from the catalyst and by maintaining the catalyst concentration in the solution at about 0.02 to 0.06 weight percent based on solvent, subsequently milling and extruding with shearing stresses in the copolymer being less than 0.03 horsepower per pound per hour, and simultaneously maintaining the temperature therein at less than 350° F.; about 10 to 50 parts by weight of a hydrocarbon plasticizer oil having an iodine number of below about 20, vulcanizing amounts of sulfur; about 25 to 150 parts by weight of carbon black; about 0 to 5.0 parts by weight of stearic acid; about 2 to 30 parts by weight of zinc oxide, and about 0.1 to 5.0 parts by weight of an accelerator per 100 parts by weight of butyl rubber copolymer at a temperature level of between about 250° and 400° F. for about 5 to 200 minutes; said layer having improved abrasion resistance.

8. Process according to claim 7 in which the butyl rubber copolymer is compounded with about 15–50 parts by weight of a hydrocarbon plasticizer oil; about 25–100 parts by weight of a finely divided carbon black; about 2–30 parts by weight of zinc oxide; about 0.1 to 5.0 parts by weight of an ultra-accelerator; about 0–5.0 parts by weight of stearic acid; and vulcanizing amounts of sulfur.

References Cited in the file of this patent
UNITED STATES PATENTS

| | | |
|---|---|---|
| 2,356,128 | Thomas et al. | Aug. 22, 1944 |
| 2,392,855 | Lightbown et al. | Jan. 15, 1946 |
| 2,532,985 | Bannon et al. | Dec. 5, 1950 |
| 2,566,384 | Tilton | Sept. 4, 1951 |
| 2,611,751 | Scott | Sept. 23, 1952 |
| 2,689,042 | Perkins | Dec. 28, 1954 |
| 2,749,960 | Schwartz | June 12, 1956 |
| 2,766,801 | Rockoff | Oct. 16, 1956 |

OTHER REFERENCES

Rubber Age, McMillan et al., March 1950, pages 663–666.

Rubber Age, "Mechanical Properties of High Mooney Elastomers," Earley et al., April 1954, pages 65–72.

Whitby: Synthetic Rubber, pages 838–854, 883–884, 889–891, John Whiley (1954).

Schildknecht: Polymer Processes, pages 719–722, Interscience (1956).